(12) United States Patent
Kusayanagi et al.

(10) Patent No.: US 11,893,890 B2
(45) Date of Patent: Feb. 6, 2024

(54) INFORMATION PROCESSING DEVICE AND METHOD FOR VEHICLE

(71) Applicant: Nissan Motor Co., Ltd., Kanagawa (JP)

(72) Inventors: Yoshinori Kusayanagi, Kanagawa (JP); Takura Yanagi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 17/753,813

(22) PCT Filed: Sep. 16, 2019

(86) PCT No.: PCT/IB2019/001129
§ 371 (c)(1),
(2) Date: Mar. 15, 2022

(87) PCT Pub. No.: WO2021/053365
PCT Pub. Date: Mar. 25, 2021

(65) Prior Publication Data
US 2022/0343765 A1    Oct. 27, 2022

(51) Int. Cl.
*G08G 1/16* (2006.01)
*G06V 20/58* (2022.01)
(Continued)

(52) U.S. Cl.
CPC ............. *G08G 1/16* (2013.01); *G06V 20/58* (2022.01); *G01C 21/34* (2013.01); *G06V 20/597* (2022.01)

(58) Field of Classification Search
CPC ........ G08G 1/16; G06V 20/58; G06V 20/597; G01C 21/34
See application file for complete search history.

(56) References Cited

U.S. PATENT DOCUMENTS

2013/0158778 A1* 6/2013 Tengler ............... G06V 40/28
701/31.5
2017/0158131 A1 6/2017 Friebe
(Continued)

FOREIGN PATENT DOCUMENTS

DE    102008021183 A1    10/2009
JP    2010049349 A    3/2010
(Continued)

*Primary Examiner* — Mohamed Barakat
(74) *Attorney, Agent, or Firm* — Osha Bergman Watanabe & Burton LLP

(57) ABSTRACT

Included are an identification data input unit (11) to which identification data for identifying an occupant of a vehicle is input, a preference data storage unit (12) configured to store preference data regarding a preference of the occupant in association with the identification data, an object acquisition unit (13) configured to acquire object data of objects existing around an occupant on board the vehicle, a determination unit (15) configured to determine whether or not an object included in the object data is visually or audibly recognizable by the occupant on board the vehicle, and a notification data generator (16) configured to generate notification data for the occupant on board the vehicle based on the preference data of the occupant and the object for which the determination unit determines that it is recognizable by the occupant. The preference data of the occupant is stored in the preference data storage unit and associated with the identification data.

7 Claims, 8 Drawing Sheets

(51) Int. Cl.
  *G06V 20/59* (2022.01)
  *G01C 21/34* (2006.01)

(56) References Cited

U.S. PATENT DOCUMENTS

| | | | |
|---|---|---|---|
| 2018/0013211 A1* | 1/2018 | Ricci | G05B 15/02 |
| 2019/0043088 A1* | 2/2019 | Garcia | B60R 1/00 |
| 2019/0071055 A1* | 3/2019 | Luchner | B60R 25/25 |
| 2020/0001687 A1* | 1/2020 | Chow | B60Q 1/503 |
| 2020/0254876 A1* | 8/2020 | Cordell | G06V 20/56 |

FOREIGN PATENT DOCUMENTS

| | | | |
|---|---|---|---|
| JP | 5966121 B2 | 8/2016 | |
| JP | 2017515101 A | 6/2017 | |

* cited by examiner

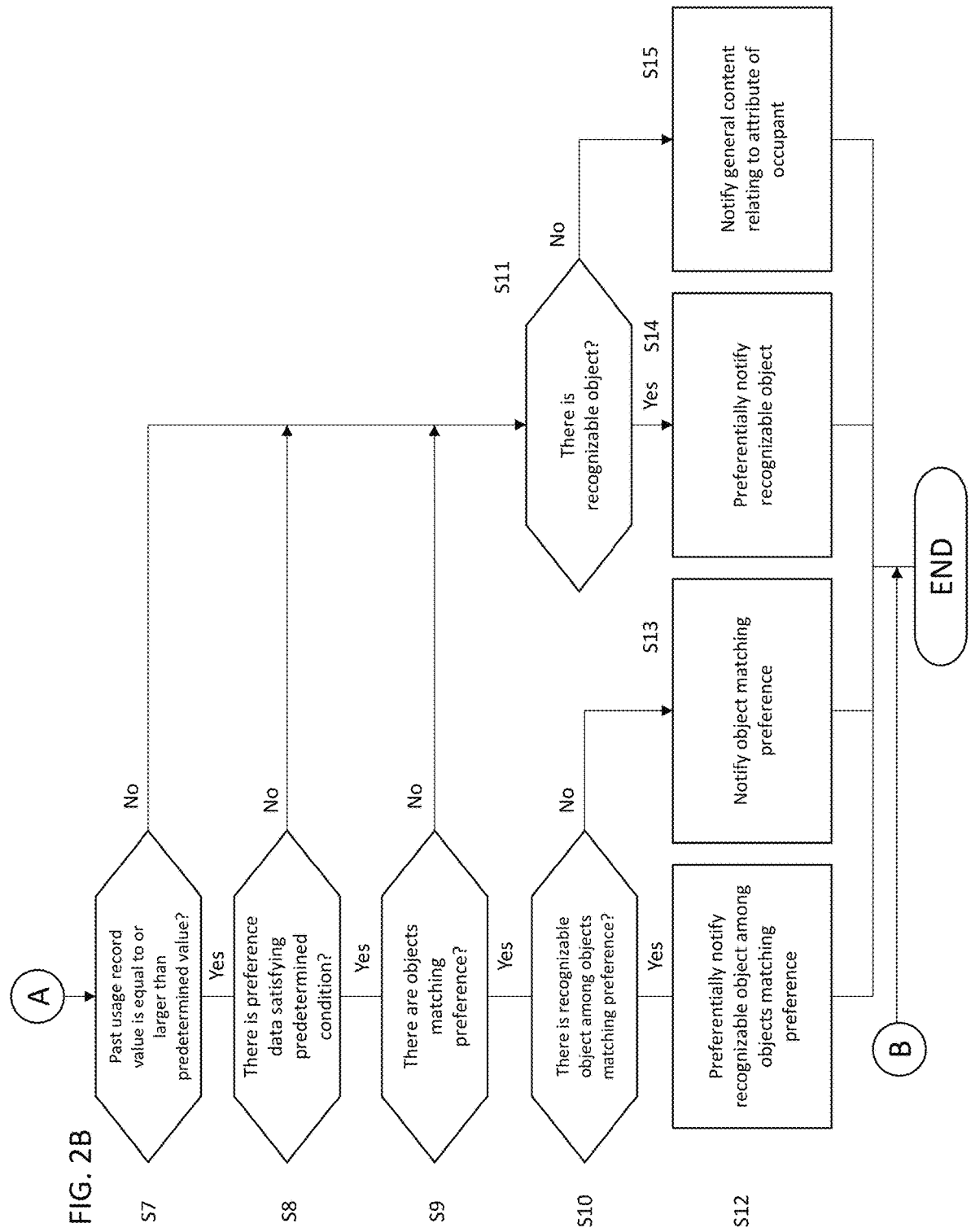

INFORMATION PROCESSING DEVICE AND METHOD FOR VEHICLE

TECHNICAL FIELD

The present invention relates to an information processing device for a vehicle and an information processing method for a vehicle.

BACKGROUND ART

A driving support system is proposed, in which the driving is supported by displaying a character on an onboard display to enable the character to have communication with the driver. For example, there is known a driving support system that outputs character information with a representation form determined based on a degree of intimacy specified in accordance with the driving state of the vehicle by the user (Patent Document 1). In this system, when the degree of intimacy is less than a predetermined threshold, the character information is output from a first output unit, while when the degree of intimacy is not less than the predetermined threshold, the character information is output from the first output unit and a second output unit.

PRIOR ART DOCUMENT

Patent Document

[Patent Document 1] JP5966121B

SUMMARY OF INVENTION

Problems to be Solved by Invention

In the above prior art, the character information to be output is changed in accordance with the degree of intimacy determined by the travel distance or the like. According to the above prior art, however, it is not possible to provide content suitable for the user from the viewpoint of the preference of each user or the surrounding environment of the user. Thus, there is a problem in that information that is even more interesting cannot be provided.

A problem to be solved by the present invention is to provide an information processing device for a vehicle and an information processing method for a vehicle that are able to provide information that is even more interesting.

Means for Solving Problems

The present invention solves the above problem by generating notification data for an occupant on board a vehicle based on preference data of the occupant and an object determined to be recognizable by the occupant among object data of objects existing around the occupant on board the vehicle. The preference data of the occupant is stored in a preference data storage unit and associated with identification data.

Effect of Invention

According to the present invention, the occupant on board the vehicle can be provided with information that is even more interesting because the information is based on the preference data of the occupant and the object data of an object recognizable for the occupant.

BRIEF DESCRIPTION OF DRAWINGS

FIG. 2B is a flowchart (part 2) illustrating the information processing procedure executed in the information processing device for a vehicle of FIG. 1B.

MODE(S) FOR CARRYING OUT THE INVENTION

Figure 1A:
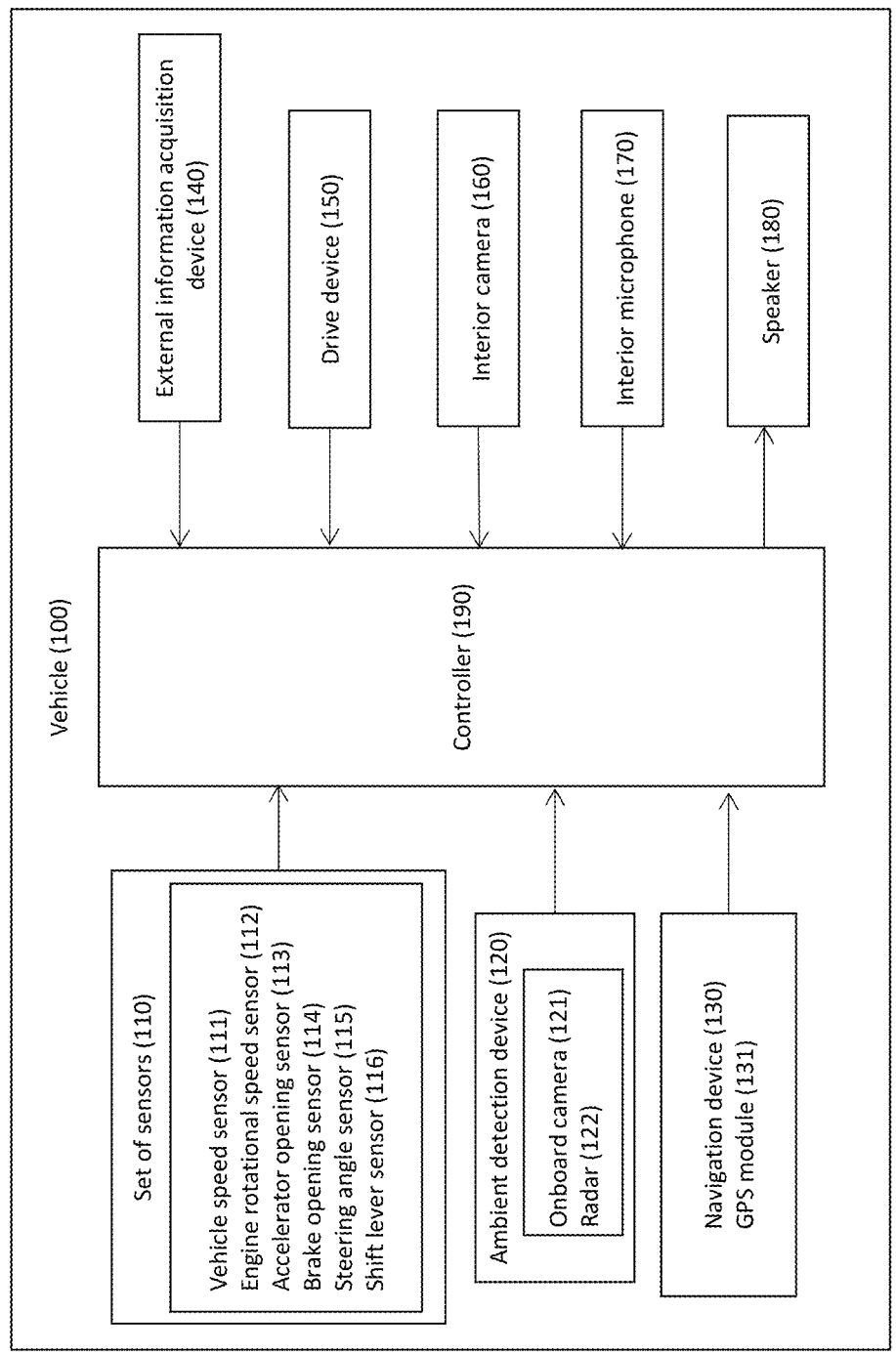
FIG. 1A is a hardware configuration diagram illustrating an embodiment of a vehicle to which the information processing device for a vehicle according to the present invention is applied.
Figure 1B:
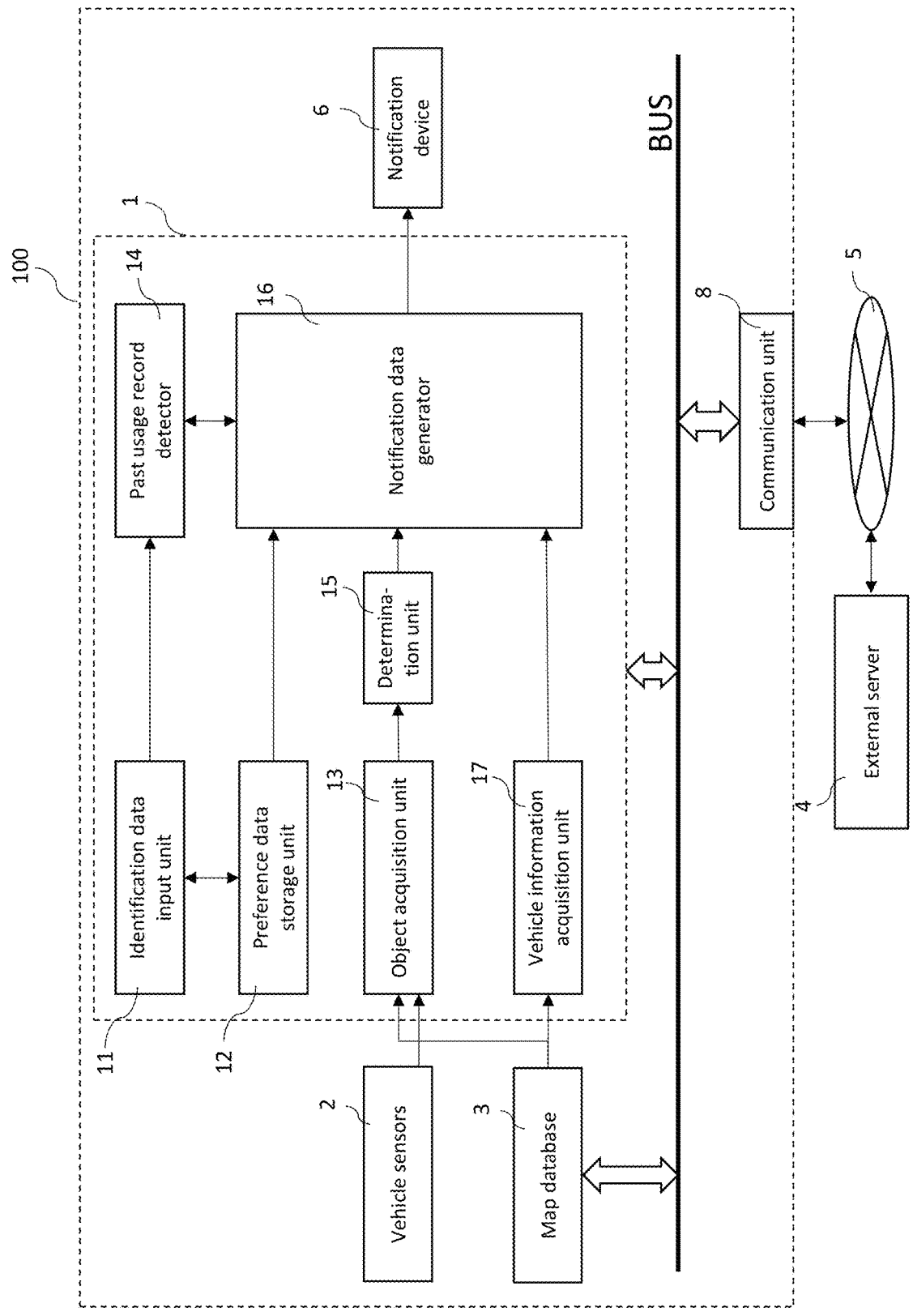
FIG. 1B is a functional block diagram illustrating an embodiment of the information processing device for a vehicle according to the present invention.

Hereinafter, one or more embodiments of the present invention will be described with reference to the drawings. FIG. 1A is a hardware configuration diagram illustrating an embodiment of a vehicle to which an information processing device 1 for a vehicle according to the present invention is applied, and FIG. 1B is a functional block diagram illustrating an embodiment of the information processing device 1 for a vehicle. The information processing device 1 for a vehicle of the present embodiment is a device that provides information to a driver and one or more passengers (the driver and passengers will also be referred to as occupants of the vehicle or simply referred to as occupants) via media of a sound or voice, an image, an action of a character robot, and a combination thereof and has a conversation with the occupants.

As illustrated in FIG. 1A, a vehicle 100 to which the information processing device 1 for a vehicle according to the present invention is applied includes a set of sensors 110, an ambient detection device 120, a navigation device 130, an external information acquisition device 140, a drive device 150, an interior camera 160, an interior microphone 170, a speaker 180, and a controller 190. These devices are connected to one another via a controller area network (CAN) or other onboard LAN to mutually exchange information. The vehicle 100 according to the present embodiment includes the controller 190.

Examples of the vehicle 100 of the present embodiment include an electric car equipped with an electric motor as the drive source, an engine car equipped with an internal combustion engine as the drive source, and a hybrid car equipped with both an electric motor and an internal combustion engine as the drive sources. The electric cars and hybrid cars equipped with electric motors as the drive sources include those in which secondary batteries are used as power sources for the electric motors and those in which fuel cells are used as power sources for the electric motors.

The set of sensors 110 is composed of devices that detect the traveling state of the vehicle. Specifically, the set of sensors 110 of the present embodiment includes a vehicle speed sensor 111, an engine rotational speed sensor 112, an accelerator opening sensor 113, a brake opening sensor 114, a steering angle sensor 115, and a shift lever sensor 116.

The ambient detection device 120 detects objects existing around the vehicle 100. Examples of the ambient detection device 120 include an onboard camera 121 and a radar 122. The onboard camera 121 captures images around the vehicle 100. The onboard camera 121 is composed, for example, of a front camera that capture images ahead of the vehicle 100, a rear camera that captures images behind the vehicle 100, and side cameras that captures images on the sides of the vehicle 100. The radar 122 detects obstacles existing around the vehicle 100. The radar 122 is composed, for example, of a front radar that detects obstacles existing ahead of the vehicle 100, a rear radar that detects obstacles existing behind the vehicle 100, and side radars that detect obstacles existing on the sides of the vehicle 100. The radar 122 detects the distance from the vehicle 100 to an obstacle and the direction in which the obstacle exists.

Examples of the objects detected by the ambient detection device 120 include pedestrians, bicycles, motorcycles, cars, road obstacles, traffic signals, road signs, and pedestrian crossings. The ambient detection device 120 may be configured to use any one of the above-described onboard camera 121 and radar 122 or may also be configured to combine two or more types. The ambient detection device 120 outputs the captured information and the detection results to the controller 190 as ambient information.

The navigation device 130 indicates the route from the current position of the vehicle 100 to a destination to guide the driver based on the positional information of the vehicle 100 detected by a GPS module 131. The navigation device 130 has map information and calculates the travel route of the vehicle 100 from the positional information of the vehicle 100 and the positional information of the destination. The navigation device 130 outputs the positional information of the vehicle 100 and information on the travel route of the vehicle 100 to the controller 190. The travel route of the vehicle 100 includes a route along which the vehicle 100 has actually traveled and a route along which the vehicle 100 will travel from now.

The external information acquisition device 140 connects to a network existing outside the vehicle 100 and acquires information on the external environment of the vehicle 100. Examples of the external information acquisition device 140 include a device that acquires various information items from a network outside the vehicle at a predetermined cycle via a communication line. For example, the external information acquisition device 140 acquires road congestion information, road construction information, and accident information from the VICS (registered trademark) system. Additionally or alternatively, the external information acquisition device 140 acquires weather information, for example, from an external server. The external information acquisition device 140 outputs the information acquired from outside the vehicle to the controller 190. The external information acquisition device 140 is not limited to acquiring information from an external server and can search for necessary information on the network and access, in accordance with the search result, a server that manages the information.

The external information acquisition device 140 is not limited to a device that acquires information on the external environment via a communication line and may also be, for example, an ambient temperature sensor that detects an ambient temperature, a humidity sensor that detects humidity, or a raindrop sensor that detects raindrops. The ambient temperature sensor outputs the ambient temperature information to the controller 190 as a detection result. The humidity sensor outputs information on the humidity to the controller 190 as a detection result. The raindrop sensor outputs information on the raindrops to the controller 190 as a detection result.

The drive device 150 includes a drive mechanism of the vehicle 100. The drive mechanism includes an electric motor and/or an internal-combustion engine as the above-described traveling drive sources of the vehicle 100, a power transmission device including a drive shaft and an automatic transmission that transmit the output of the traveling drive sources to the drive wheels, a braking device (not illustrated) that brakes the wheels, and other necessary components. The drive device 150 generates respective control signals for these components of the drive mechanism and executes the travel control including acceleration/deceleration of the vehicle. These control signals for the drive mechanism are generated based on input signals by the driver's accelerator operation and brake operation and control signals acquired from the vehicle controller (not illustrated) or the travel control device (not illustrated). Control information may be transmitted to the drive device 150, which can thereby perform the travel control including acceleration/deceleration of the vehicle in an automated or autonomous manner. In the case of a hybrid car, the drive device 150 may receive a ratio of the torque output to the electric motor and the torque output to the internal-combustion engine in accordance with the traveling state of the vehicle.

The subject which drives the vehicle 100 of the present embodiment is the subject which controls the drive device 150, and is the driver of the vehicle 100 or the vehicle controller. The vehicle 100 travels by the driving operation of the driver or by the autonomous driving operation by the vehicle controller. For example, although not illustrated in FIG. 1A, the vehicle 100 is provided with an instrument (e.g., a button-shaped switch) for switching the subject of the driving operation. The driver can use this switch to switch between the manual driving operation and the driving operation by the vehicle controller. The driving operation by the vehicle controller refers to a driving operation by so-called autonomous driving, which is a driving operation that allows the vehicle to travel autonomously. As the autonomous driving technologies, those known at the time of filing the present application can be appropriately used. The drive device 150 outputs the information on the driving subject which is driving the vehicle 100 to the controller 190 as the driving subject information.

The interior camera 160 is provided at a position from which occupants of the vehicle 100 can be imaged, and captures images of the occupants. In the present embodiment, the interior camera 160 captures images of the driver among the occupants of the vehicle 100. The interior camera 160 is preferably provided at a position from which the facial expression of the driver including the line of sight of the driver and the driving operation by the driver can be imaged. The interior camera 160 outputs the information on the captured images of the driver to the controller 190.

The interior microphone 170 acquires voice information of occupants of the vehicle 100 and stores the voice information at least temporarily. In the present embodiment, the interior microphone 170 acquires voice information of the driver among the occupants of the vehicle 100. The installation position of the interior camera 160 is not particularly limited, but it is preferred to install the interior camera 160 in the vicinity of the seat of an occupant.

The speaker 180 outputs voice information to occupants of the vehicle 100. In the present embodiment, the speaker 180 outputs voice information to the driver among the occupants of the vehicle 100. The installation position of the speaker 180 is not particularly limited, but it is preferred to install the speaker 180 in the vicinity of the seat of an occupant.

The controller 190 is composed of a read only memory (ROM) that stores programs, a central processing unit (CPU) that executes the programs stored in the ROM, and a random access memory (RAM) that serves as an accessible storage device. The programs stored in the ROM include those for executing a dialogue process with an occupant of the vehicle 100 using a dialogue program in accordance with the load of the occupant. As substitute for or in addition to the CPU, a micro processing unit (MPU), a digital signal processor (DSP), an application specific integrated circuit (ASIC), a field programmable gate array (FPGA), or the like can be used as the operation circuit. The controller 190 operates the CPU to execute the programs stored in the ROM, thereby executing various control functions.

The information processing device 1 for a vehicle of the present embodiment is established as a part of the controller 190 of FIG. 1A. The information processing device 1 for a vehicle of the present embodiment is composed of a computer including a ROM that stores programs for executing various processes, a CPU as an operation circuit that executes the programs stored in the ROM to serve as the information processing device 1 for a vehicle, and a RAM that serves as an accessible storage device. As illustrated in FIG. 1B, when viewed from the functional configuration exhibited by executing the information processing program, the information processing device 1 for a vehicle includes an identification data input unit 11, a preference data storage unit 12, an object acquisition unit 13, a past usage record detector 14, a determination unit 15, and a notification data generator 16 and may further include a vehicle information acquisition unit 17, if necessary. The configuration of the information processing device 1 for a vehicle of the present embodiment will be described below with reference to FIG. 1B.

The identification data input unit 11 is an interface for inputting identification data for identifying an occupant of the vehicle to which the information processing device 1 for a vehicle of the present embodiment is applied. When an occupant gets on the vehicle while carrying a terminal device (portable computer such as a smartphone) that stores his/her identification data, the identification data input unit 11 automatically or semi-automatically reads the identification data of the occupant via a short-range wireless communication network such as Bluetooth (registered trademark), or the occupant manually inputs the identification data of the occupant using an input button (not illustrated) that is set as the identification data input unit 11, and the identification data of the occupant is thus entered. Additionally or alternatively, the wireless key of the vehicle may be made to store the identification data of the occupant, and when the vehicle is unlocked or started using the wireless key, the identification data input unit 11 may automatically or semi-automatically read the identification data of the occupant via a short-range wireless communication network.

The preference data storage unit 12 is a storage device such as a database that stores preference data regarding the preferences of each person who can be an occupant in association with the identification data. The preference data is data of hobby and other matters which each occupant is interested in, and is organized, for example, by genre. For example, the preference data is stored such that Mr. X is interested in sports, meals, and fashion and especially likes baseball among the sports and ramen among the meals. For such preference data, the occupant may manually input his/her own preference data, or the preference data may be analyzed from the past usage record of the vehicle.

As substitute for or in addition to the above, the preference data may be determined through accumulating the personal data of the occupant in the preference data storage unit 12, such as by counting the number of times the occupant has browsed WEB sites using a computer on a daily basis or counting the commercial products the occupant has purchased using a credit card, and analyzing the accumulated data. For example, if the preference data storage unit 12 accumulates the data that the number of times the above Mr. X has browsed WEB sites belonging to the genres of sports, meals, and fashion is higher than that of other genres on a daily basis, the preference data of Mr. X is determined as the sports, meals, and fashion. Additionally or alternatively, if the preference data storage unit 12 accumulates the data that Mr. X has purchased baseball game tickets twice a month using a credit card, the preference data of Mr. X is determined such that he especially likes baseball among the sports.

The object acquisition unit 13 acquires object data of objects existing around an occupant on board the vehicle. The object acquisition unit 13 executes an image analysis process for recognizing a specific object (physical object) from image data around the vehicle captured by an onboard imaging device such as a camera included in vehicle sensors 2. Additionally or alternatively, the object acquisition unit 13 extracts a specific object from a vehicle position detection device such as a GPS receiver included in the vehicle sensors 2 and map data stored in a map database 3. Objects specified by the object acquisition unit 13 include, but are not limited to, buildings, stores, vehicles, pedestrians, roads, intersections, etc. Buildings include landmarks such as Yokohama Stadium (registered trademark), Yokohama Cosmoworld (registered trademark), and Yokohama Red Brick Warehouse (registered trademark). Stores include restaurants, apparel stores, etc. Roads include the Metropolitan Expressway Yokohama Line, etc.

The past usage record detector 14 detects the past record of use by an occupant of the information processing device 1 for a vehicle. What are detected by the past usage record detector 14 include, but are not limited to, a past usage record value that is calculated through specifying an occupant based on the identification data input to the identification data input unit 11 and determining the time and/or frequency when the occupant used the information processing device 1 for a vehicle. The past usage record value calculated by the past usage record detector 14 is output to the notification data generator 16, and the notification data to be generated is determined in accordance with the magnitude of the past usage record value. Details of this will be described later. The past usage record detector 14 may be omitted as necessary.

The determination unit 15 determines whether or not an object included in the object data acquired by the object acquisition unit 13 is visually or audibly recognizable by the occupant on board the vehicle. The object acquisition unit 13 extracts objects from the image data around the vehicle captured by an onboard imaging device and also extracts a specific object from a vehicle position detection device such as a GPS receiver included in the vehicle sensors 2 and the map data stored in the map database 3. Therefore, even though an extracted object exists around the vehicle, the object may often be in a positional relationship or other environmental relationship that does not allow the occupant to visually or audibly recognize the object. Even if the occupant is notified of information regarding an object that exists around the vehicle but is not visually or audibly recognizable from the occupant, the occupant may rather feel stress; therefore, the determination unit 15 determines whether or not the object acquired by the object acquisition unit 13 is recognizable by the occupant, and outputs the determination result to the notification data generator 16.

When an object is extracted from the image data around the vehicle captured by the onboard imaging device, the determination unit 15 determines that the object is recognizable by the occupant because the object can be visually recognized through the onboard imaging device. On the other hand, when a specific object is extracted from the vehicle position detection device such as a GPS receiver included in the vehicle sensors 2 and the map data stored in the map database 3, the determination unit 15 checks the object with the image data around the vehicle captured by the onboard imaging device to determine whether or not the object acquired by the object acquisition unit 13 is recognizable by the occupant. In the above examples, an example of determining whether or not the object is visually or audibly recognizable is described, but the present invention is not limited to this. For example, it can be determined that vibrations that can be felt by the body, acceleration and acceleration gravity corresponding to shaking and vehicle movement, etc. are recognizable.

The notification data generator 16 generates the notification data for the occupant based on the preference data of the occupant, which is stored in the preference data storage unit 12 and associated with the identification data, and the object for which the determination unit 15 determines that it is recognizable by the occupant. The notification data generated by the notification data generator 16 refers to a sound or voice, an image, an action of a character robot, or a combination thereof that is output from the notification device 6, which will be described later. For example, when generating the notification data by a sound or voice or a text image for a user whose preference data includes "baseball," the user is notified as follows. "Yokohama won the Yokohama-Hanshin game last night with a score of 8 to 7. As a result, Yokohama is close to the top Giants by one game." Additionally or alternatively, when the notification data is generated as an object determined to be recognizable for the occupant, the notification data may include information regarding a relative position or distance from the vehicle in which the occupant is on board. For example, when, for a user whose preference data includes "bread," a "bakery" as an object relating to "bread" is detected within a predetermined distance (e.g., 50 m) from the vehicle, the notification data generator generates the notification data: "There is a bakery 50 m ahead." and notifies it to the user.

First, the notification data generator 16 of the present embodiment determines the notification data to be notified in accordance with: whether or not the preference data of the occupant is stored in the preference data storage unit 12 or whether or not the preference data stored in the preference data storage unit 12 satisfies a predetermined condition; and whether or not there is an object for which the determination unit 15 determines that it is recognizable by the occupant. The situation that the preference data stored in the preference data storage unit 12 satisfies the predetermined condition means that the preference data storage unit 12 accumulates reliable preference data to such an extent that the preference of the occupant is sufficiently reflected.

More specifically, when an object for which the determination unit 15 determines that it is recognizable by the occupant exists around the vehicle, the notification data generator 16 preferentially generates information regarding the recognizable object as the notification data. Additionally or alternatively, when the preference data of the occupant on board the vehicle is not stored in the preference data storage unit 12 or when the preference data stored in the preference data storage unit 12 does not satisfy the predetermined condition, the notification data generator 16 generates information regarding the recognizable object as the notification data without adopting the preference data as the notification data.

Additionally or alternatively, when the preference data of the occupant on board the vehicle is stored in the preference data storage unit 12 and there are objects for which the determination unit 15 determines that they are recognizable by the occupant, the notification data generator 16 generates, as the notification data, an object relating to the preference data of the occupant among the objects for which the determination unit 15 determines that they are recognizable by the occupant.

Additionally or alternatively, the notification data generator 16 generates the notification data in accordance with the magnitude of the past usage record value detected by the past usage record detector 14, as follows. First, when the past usage record value of the occupant on board the vehicle detected by the past usage record detector 14 is less than a predetermined value, the notification data generator 16 generates information regarding the recognizable object as the notification data without adopting the preference data as the notification data. This is because if the past usage record value regarding the information processing device 1 for a vehicle is small, it cannot be said that the preference data of the occupant is sufficiently reliable.

On the other hand, when the past usage record value of the occupant on board the vehicle detected by the past usage record detector 14 is larger than the predetermined value, the notification data generator 16 generates the notification data based on the preference data of the occupant and the object determined to be recognizable.

The vehicle sensors 2 include, in addition to the above-described onboard imaging device, a radar device that detects obstacles around the vehicle, a vehicle position detection device that includes a GPS receiver, a steering angle sensor that detects the steering angle of the vehicle, an acceleration/deceleration sensor that detects acceleration/deceleration of the vehicle, an interior camera that images the interior of the vehicle, etc. The detection signals detected by the vehicle sensors 2 are output to the object acquisition unit 13 and the vehicle information acquisition unit 17.

The map database 3 is a memory that stores, for example, three-dimensional high-precision map information including positional information of various facilities and specific points and is accessible from the object acquisition unit 13 and the vehicle information acquisition unit 17. The three-dimensional high-precision map information stored in the map database 3 is three-dimensional map information based on the road shape detected when traveling along an actual road using a vehicle for data acquisition and is map information in which detailed and highly precise positional information of a curved road and the size of the curve (e.g., curvature or radius of curvature), a merging point of roads, a branching point, a tollgate, a position at which the number of lanes changes, a service area/parking area, etc. is associated with the map information as three-dimensional information.

The notification device 6 includes at least one of a speaker, a display, and a character robot and operates to output the notification data as a sound or voice from the speaker into the vehicle, display the notification data in an image including characters on the display, and/or express the notification data by an action of the character robot. The character robot is an anthropomorphic three-dimensional onboard robot that expresses the notification data by the action of a face or hands together with a sound or voice or a character image. A two-dimensional image may be displayed on a display.

As described above, when storing the preference data of an occupant in the preference data storage unit 12, the preference data may be determined through accumulating the personal data of the occupant in the preference data storage unit 12, such as by counting the number of times the occupant has browsed WEB sites using a computer on a daily basis or counting the commercial products the occupant has purchased using a credit card, and analyzing the accumulated data. When collecting the preference data using such a method, information from external WEB sites or other external server 4 is collected via a telecommunication network 5 such as the Internet and a communication unit 8 of the vehicle 100.

Figure 2A:
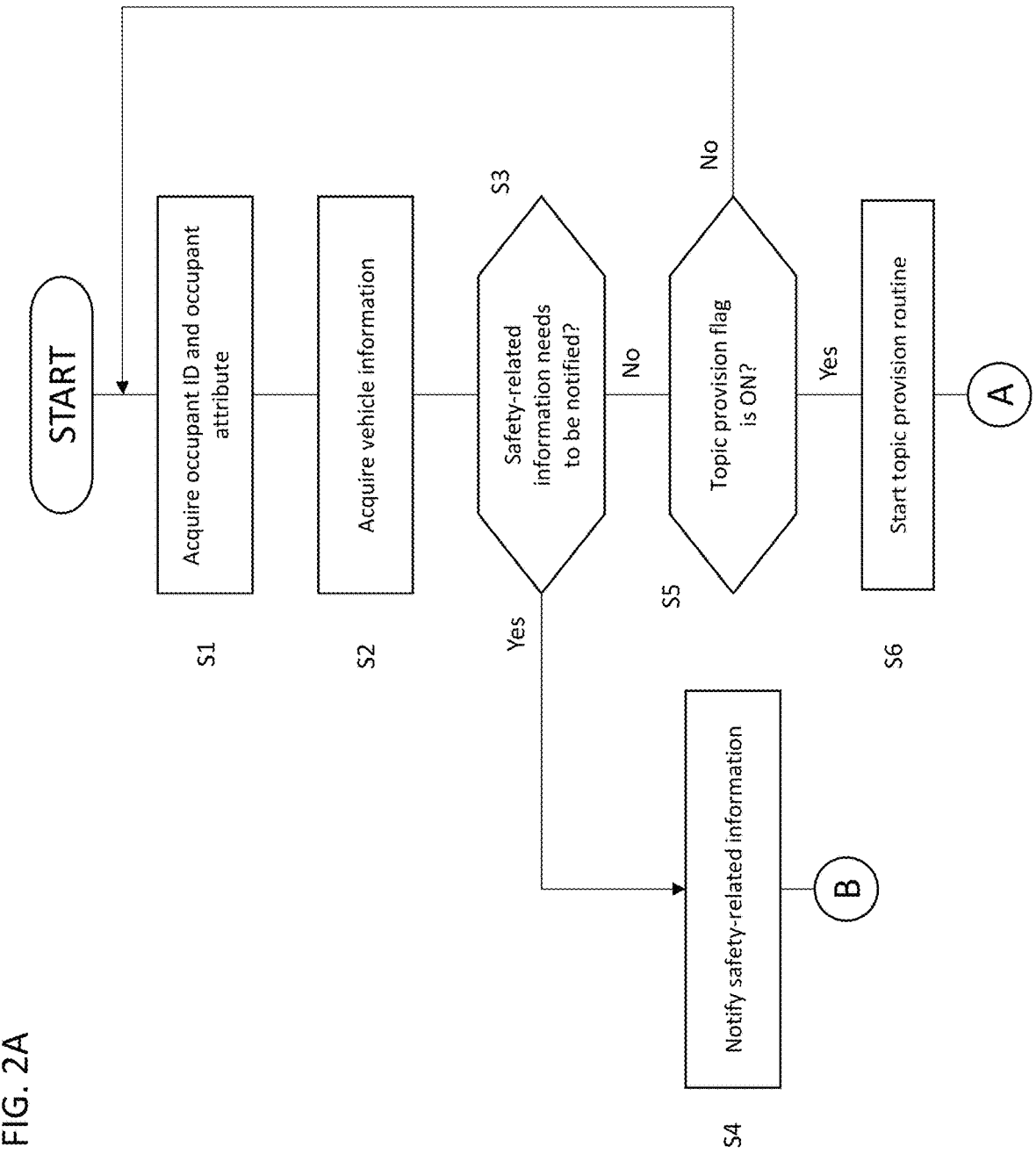
FIG. 2A is a flowchart (part 1) illustrating an information processing procedure executed in the information processing device for a vehicle of FIG. 1B.

The information processing procedure of the information processing device 1 for a vehicle of the present embodiment will then be described. FIGS. 2A and 2B are flowcharts illustrating an information processing procedure executed by the information processing device 1 for a vehicle of FIG. 1B. First, when an occupant gets on the vehicle, the identification data of the occupant is input to the identification data input unit 11 in step S1. The identification data input unit 11 acquires the preference data and other attributes of the occupant from the preference data storage unit 12 together with the identification data and outputs the acquired data to the notification data generator 16 together with the identification data.

In step S2, the vehicle information acquisition unit 17 acquires information regarding the vehicle from the vehicle sensors 2 and the map database 3 and outputs the acquired information to the notification data generator 16. The information regarding the vehicle includes stationary vehicle condition information as well as vehicle failure information, accident information of transportation facilities, and other safety-related information. Then, in step S3, the notification data generator 16 determines whether or not the vehicle information acquired by the vehicle information acquisition unit 17 includes safety-related information that needs to be notified, and when there is safety-related information that needs to be notified, the process proceeds to step S4, in which the notification device 6 is used to preferentially notify the information. After the notification, the process is temporarily terminated.

In step S3, when there is not such safety-related information that needs to be notified, the process proceeds to step S5, in which a determination is made as to whether or not a topic provision flag is ON. When the topic provision flag is ON, the process proceeds to step S6, while when the topic provision flag is OFF, the process returns to step S1. The topic provision flag refers to a flag for setting whether or not to execute a routine in which the information processing device 1 for a vehicle of the present embodiment is used to provide information to the driver and one or more passengers via media of a sound or voice, an image, an action of a character robot, and a combination thereof and have a conversation with an occupant. The topic provision flag may be always ON, but may be made possible to set ON/OFF by a given input button in accordance with the wish of an occupant.

When the topic provision flag is ON, the topic provision routine in steps S6 to S15 is executed. First, in step S7, the notification data generator 16 determines whether or not the past usage record value detected by the past usage record detector 14 is equal to or larger than a predetermined value, and when the value is equal to or larger than the predetermined value, the process proceeds to step S8, while when the value is less than the predetermined value, the process proceeds to step S11.

In step S8, the notification data generator 16 determines whether or not the preference data of the occupant stored in association with the identification data is stored in the preference data storage unit 12 and the preference data satisfies a predetermined condition, and when the predetermined condition is satisfied, the process proceeds to step S9, while when the predetermined condition is not satisfied, the process proceeds to step S11. The situation that the preference data stored in the preference data storage unit 12 satisfies the predetermined condition means that the preference data storage unit 12 accumulates reliable preference data to such an extent that the preference of the occupant is sufficiently reflected.

In step S9, the notification data generator 16 determines whether or not one or more objects acquired by the object acquisition unit 13 match the preference data determined in step S8, and when there are one or more matching objects, the process proceeds to step 10, while when there is no matching object, the process proceeds to step S11.

In step S10, the notification data generator 16 determines whether or not there is an object that is visually or audibly recognizable by the occupant among the objects that match the preference data determined in step S9, and when there is a recognizable object, the process proceeds to S12, while when there is no recognizable object, the process proceeds to step S13.

In step S12, the conditions have been established that the past usage record value is equal to or larger than the predetermined value, the preference data of the occupant stored in the preference data storage unit 12 is sufficiently reliable, the object matching the preference data exists around the occupant, and the object is visually or audibly recognizable, and therefore the notification data generator 16 preferentially outputs the information regarding the recognizable object to the notification device 6 and notifies it to the occupant.

Figure 3:
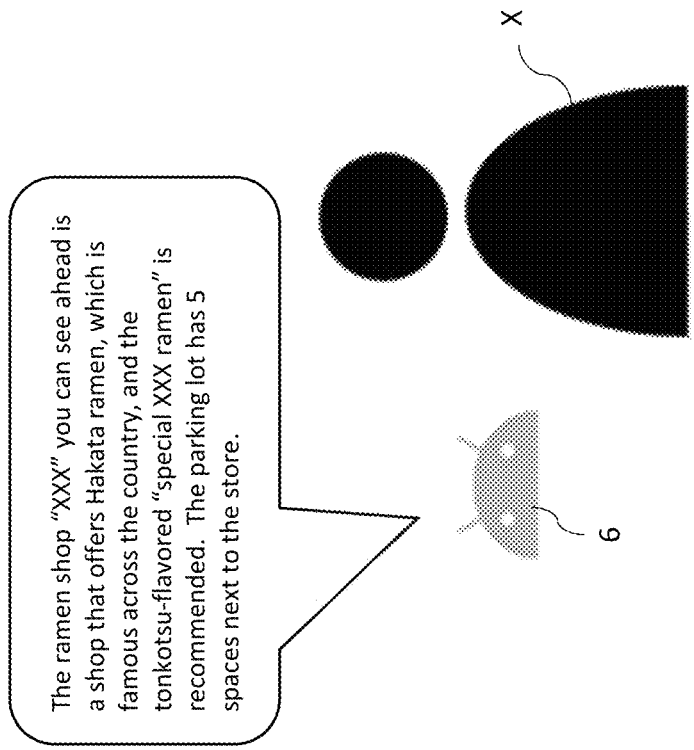
FIG. 3 is a set of diagrams illustrating an example of a situation when step S12 of FIG. 2B is reached.
Figure 3:
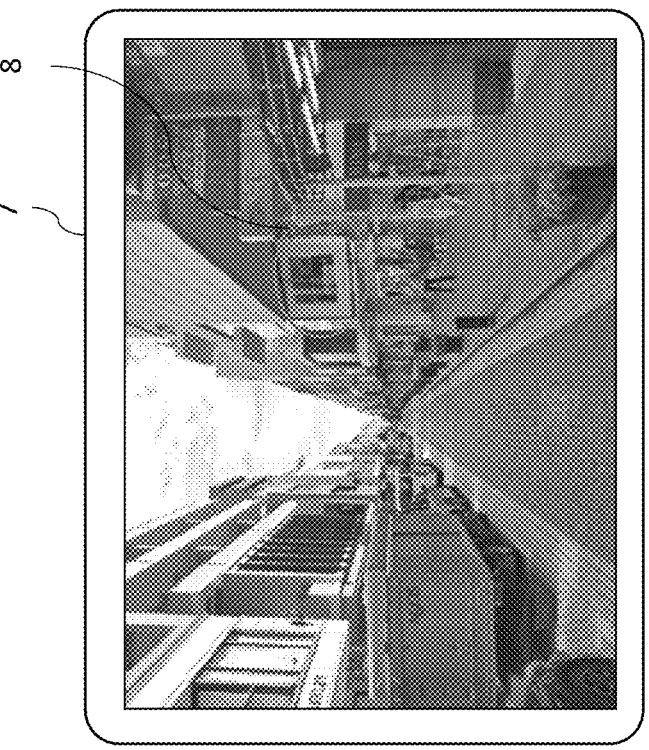

FIG. 3 is a set of diagrams illustrating an example of a situation when step S12 is reached, in which reference numeral 6 indicates a character robot type notification device, reference character X indicates an occupant, and reference numeral 7 indicates the object data of objects that exist around the occupant and are imaged by the onboard imaging device. Here, it is assumed that the preference data that the occupant X is interested in sports, meals, and fashion and especially likes baseball among the sports and ramen among the meals is stored in the preference data storage unit 12 with reliability to such an extent that a predetermined condition is satisfied. It is also assumed that in the object data 7 of objects that exist around the occupant and are imaged by the onboard imaging device, a railway-station shopping area is observed ahead of the vehicle which is currently traveling, and a ramen shop 8 is recognized so as to be visually recognizable in the railway-station shopping area.

In such a situation, the notification data generator 16 preferentially notifies the occupant of information regarding the "ramen shop" which is an object matching the preference of the occupant and is visually recognizable. For example, the character robot type notification device 6 outputs the notification data by a voice as follows. "The ramen shop 'XXX' you can see ahead is a shop that offers Hakata ramen, which is famous across the country, and the tonkotsu-flavored 'special XXX ramen' is recommended. The parking lot has 5 spaces next to the store."

During this notification, information regarding the object to be notified may be searched from the external server 4 via the telecommunication network 5. Additionally or alternatively, in order to have a dialogue with the occupant X, information may be gradually detailed and output, such as through first asking that "You may see the ramen shop 'XXX' ahead. Do you want to know the details of this shop?" and then searching for the store information (opening hours, regular holidays, menus, prices, etc.).

In step S13, the conditions have been established that the past usage record value is equal to or larger than the predetermined value, the preference data of the occupant stored in the preference data storage unit 12 is sufficiently reliable, and the object matching the preference data exists around the occupant, but the object is not visually or audibly recognizable, and therefore the notification data generator 16 outputs the information regarding the object matching the preference rather than the unrecognizable object to the notification device 6 and notifies the former object to the occupant.

Figure 4:
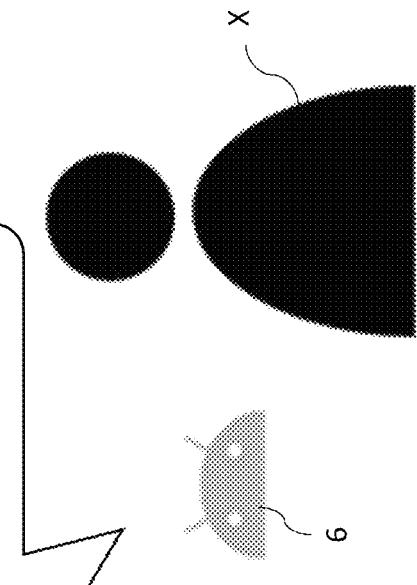
FIG. 4 is a set of diagrams illustrating an example of a situation when step S13 of FIG. 2B is reached.
Figure 4:
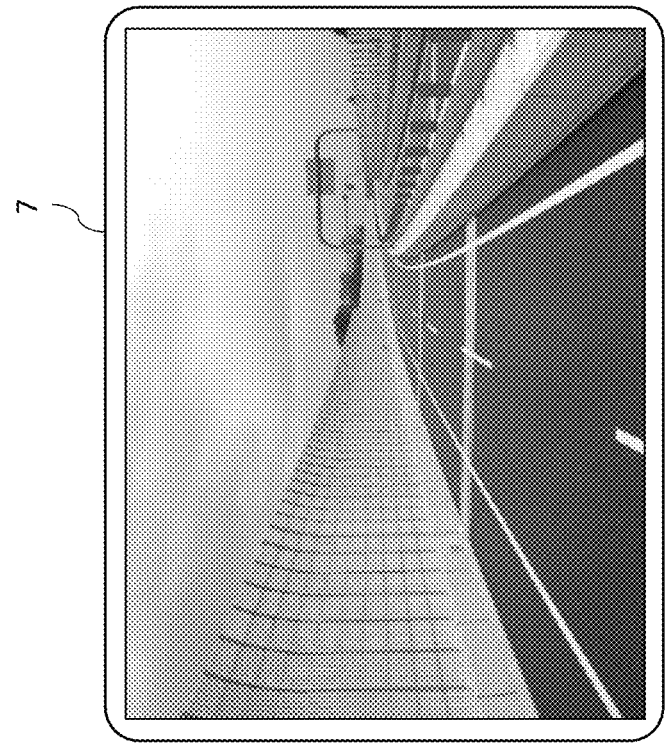

FIG. 4 is a set of diagrams illustrating an example of a situation when step S13 is reached, in which reference numeral 6 indicates a character robot type notification device, reference character X indicates an occupant, and reference numeral 7 indicates the object data of objects that exist around the occupant and are imaged by the onboard imaging device. Here, it is assumed that the preference data that the occupant X is interested in sports, meals, and fashion and especially likes baseball among the sports and ramen among the meals is stored in the preference data storage unit 12 with reliability to such an extent that a predetermined condition is satisfied. It is also assumed that in the object data 7 of objects that exist around the occupant and are imaged by the onboard imaging device, the vehicle is currently traveling on an expressway, and only the expressway is observed ahead of the vehicle.

In such a situation, the object acquired from the object data 7 of objects existing around the occupant and imaged by the onboard imaging device has a weak relationship with the preference data of the occupant, and the notification data generator 16 therefore notifies the occupant of information regarding baseball (sports genre) which matches the preference of the occupant. For example, the character robot type notification device 6 outputs the notification data by a voice as follows. "Yokohama won the Yokohama-Hanshin game last night with a score of 8 to 7. As a result, Yokohama is close to the top Giants by one game."

During this notification, information regarding baseball of the preference data to be notified may be searched from the external server 4 via the telecommunication network 5. Additionally or alternatively, in order to have a dialogue with the occupant X, information may be gradually detailed and output, such as through first asking that "Do you want to know the result of last night's Yokohama-Hanshin game?" and then searching for information on the game (scoring results, winning/losing pitchers, home runs, changes in ranking, etc.).

When the past usage record value is less than the predetermined value in step S7, or when the preference data satisfying the predetermined condition is not stored in the preference data storage unit 12 in step S8, or when there is no object that matches the preference data in step S9, the process proceeds to step S11, in which the notification data generator 16 determines whether or not a visually or audibly recognizable object exists in the object data. When a visually or audibly recognizable object exists in the object data, the process proceeds to step S14, while when a visually or audibly recognizable object does not exist in the object data, the process proceeds to step S15.

In step S14, the conditions have been established that the past usage record value is less than the predetermined value, or the preference data of the occupant stored in the preference data storage unit 12 is not sufficiently reliable, or the object matching the preference data does not exist around the occupant, and the object is visually or audibly recognizable, and therefore the notification data generator 16 preferentially outputs the information regarding the recognizable object to the notification device 6 and notifies it to the occupant.

Figure 5:
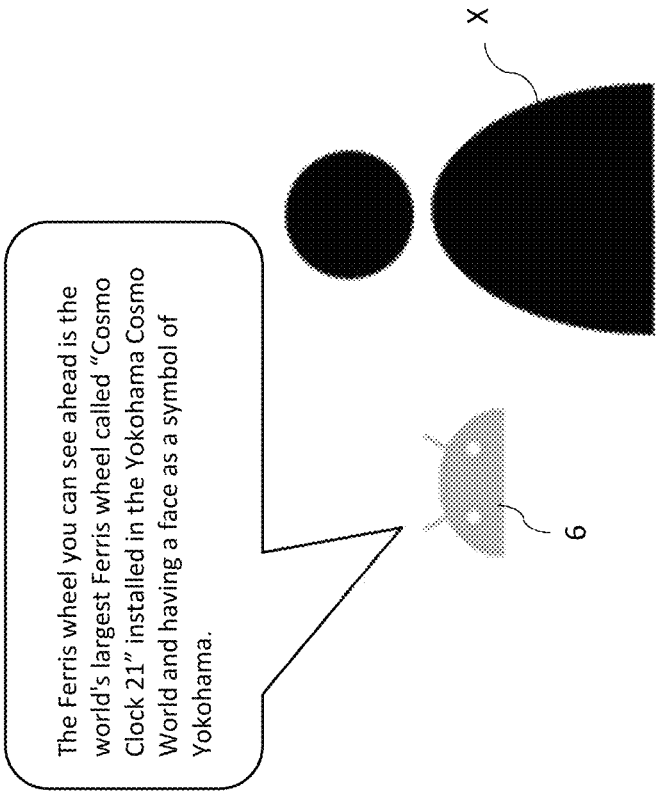
FIG. 5 is a set of diagrams illustrating an example of a situation when step S14 of FIG. 2B is reached.
Figure 5:
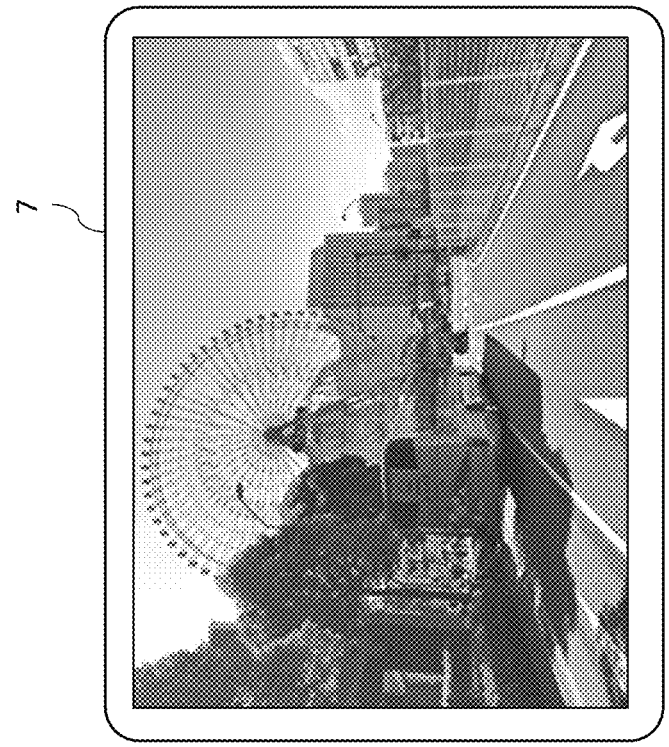

FIG. 5 is a set of diagrams illustrating an example of a situation when step S14 is reached, in which reference numeral 6 indicates a character robot type notification device, reference character X indicates an occupant, and reference numeral 7 indicates the object data of objects that exist around the occupant and are imaged by the onboard imaging device. Here, it is assumed that the preference data of the occupant X is not stored in the preference data storage unit 12 with reliability to such an extent that a predetermined condition is satisfied. It is also assumed that in the object data 7 of objects that exist around the occupant and are imaged by the onboard imaging device, the Yokohama Cosmoworld (registered trademark) is observed ahead of the vehicle which is currently traveling, and a Ferris wheel is recognized so as to be visually recognizable therein.

In such a situation, the preference data of the occupant recorded in the preference data storage unit 12 is unreliable to be used for generation of the notification data, and the notification data generator 16 therefore notifies the occupant of information regarding a recognizable object that is acquired from the object data 7 of objects existing around the occupant and imaged by the onboard imaging device. For example, the character robot type notification device 6 outputs the notification data by a voice as follows. "The Ferris wheel you can see ahead is the world's largest Ferris wheel called 'Cosmo Clock 21' installed in the Yokohama Cosmo World and having a face as a symbol of Yokohama."

During this notification, information regarding the Ferris wheel of the recognizable object to be notified may be searched from the external server 4 via the telecommunication network 5. Additionally or alternatively, in order to have a dialogue with the occupant X, information may be gradually detailed and output, such as through first asking that "Do you want to know the content of the Ferris wheel?" and then searching for the Ferris wheel.

In step S15, the conditions have been established that the past usage record value is less than the predetermined value, or the preference data of the occupant stored in the preference data storage unit 12 is not sufficiently reliable, or the object matching the preference data does not exist around the occupant, and the object is not visually or audibly recognizable, and therefore the notification data generator 16 outputs the general content regarding the attributes of the occupant to the notification device 6 and notifies the content to the occupant.

Figure 6:
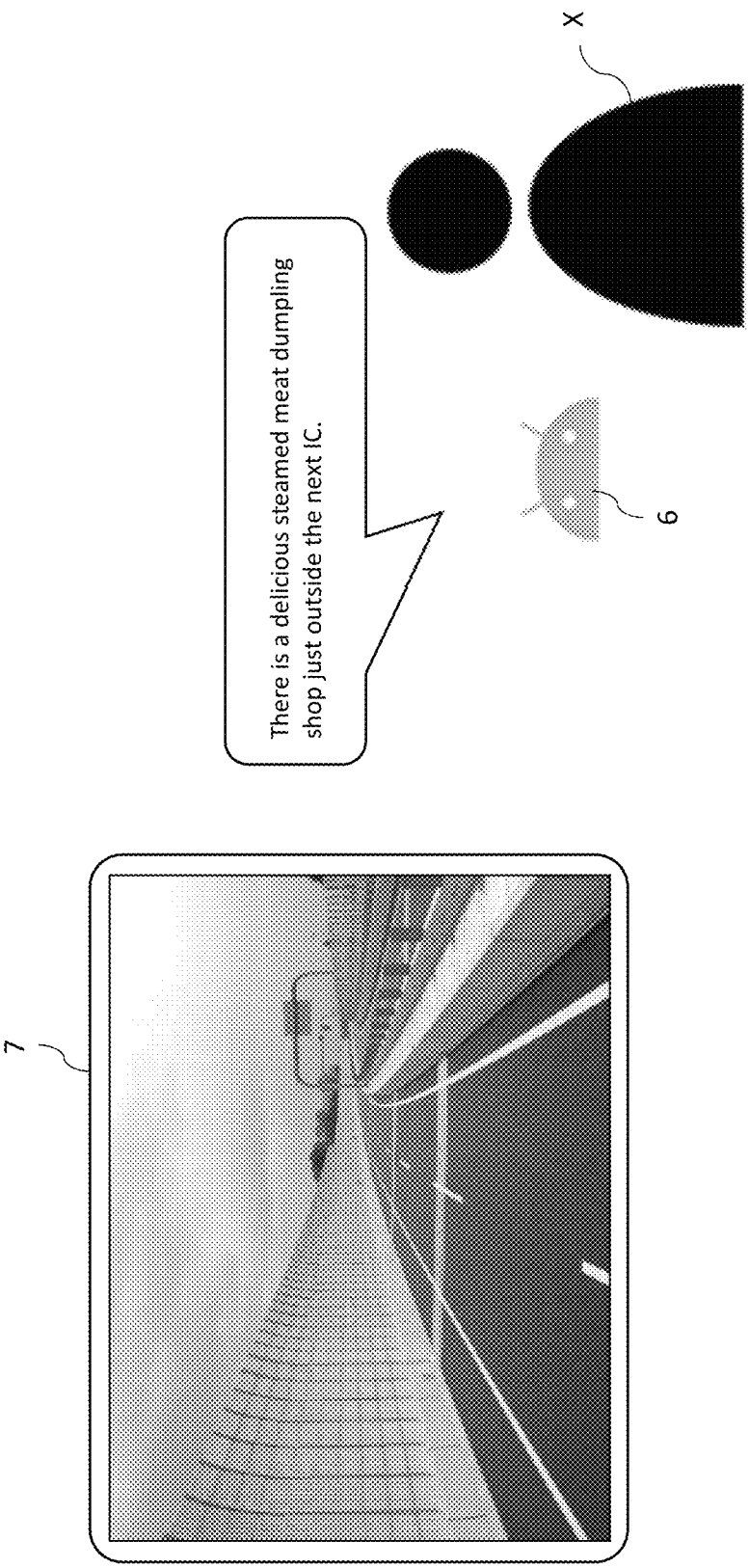
FIG. 6 is a set of diagrams illustrating an example of a situation when step S15 of FIG. 2B is reached.

FIG. 6 is a set of diagrams illustrating an example of a situation when step S15 is reached, in which reference numeral 6 indicates a character robot type notification device, reference character X indicates an occupant, and reference numeral 7 indicates the object data of objects that exist around the occupant and are imaged by the onboard imaging device. Here, it is assumed that the preference data of the occupant X is not stored in the preference data storage unit 12 with reliability to such an extent that a predetermined condition is satisfied. It is also assumed that in the object data 7 of objects that exist around the occupant and are imaged by the onboard imaging device, the vehicle is currently traveling on an expressway, and only the expressway is observed ahead of the vehicle.

In such a situation, the preference data of the occupant recorded in the preference data storage unit 12 is unreliable to be used for generation of the notification data, while on the other hand, it is not known whether the occupant is interested in the object acquired from the object data 7 of objects existing around the occupant and imaged by the onboard imaging device, and the notification data generator 16 therefore notifies the occupant of information regarding a general object that is acquired from the object data 7 of objects existing around the occupant and imaged by the onboard imaging device. For example, the notification device 6 outputs the notification data by a voice as follows. "There is a delicious steamed meat dumpling shop just outside the next IC."

During this notification, information regarding the steamed meat dumpling shop of the unrecognizable object to be notified may be searched from the external server 4 via the telecommunication network 5. Additionally or alternatively, in order to have a dialogue with the occupant X, information may be gradually detailed and output, such as through first asking that "Do you want to know the content of a steamed meat dumpling shop?" and then searching for information on the steamed meat dumpling shop.

As described above, according to the information processing device 1 and method for a vehicle of the present embodiment, the notification data for the occupant on board the vehicle is generated based on the preference data of the occupant and the object for which the determination unit 15 determines that it is recognizable by the occupant, wherein the preference data of the occupant is stored in the preference data storage unit 12 and associated with the identification data. In other words, the content of the notification data is determined in accordance with the ratio between the reliability of the preference data of the occupant and the existence of the recognizable object; therefore, the content suitable for the occupant can be provided in accordance with the preference of the individual occupant and the surrounding environment of the vehicle which is traveling, and it is possible to provide information that is even more interesting.

Moreover, according to the information processing device 1 and method for a vehicle of the present embodiment, the notification data to be generated is determined in accordance with: whether or not the preference data of the occupant on board the vehicle is stored in the preference data storage unit 12 or whether or not the preference data stored in the preference data storage unit 12 satisfies a predetermined condition; and whether or not there is an object for which the determination unit 15 determines that it is recognizable by the occupant. That is, the notification data to be generated is determined in accordance with the reliability of the preference data and the recognizability of the object, and it is therefore possible to increase the possibility that the content suitable for the occupant can be provided.

Furthermore, according to the information processing device 1 and method for a vehicle of the present embodiment, when there is an object for which the determination unit 15 determines that it is recognizable by the occupant, information regarding the recognizable object is preferentially generated as the notification data, and it is therefore possible to provide interesting information that is at least visible.

In addition, according to the information processing device 1 and method for a vehicle of the present embodiment, when the preference data of the occupant on board the vehicle is not stored in the preference data storage unit 12 or when the preference data stored in the preference data storage unit 12 does not satisfy the predetermined condition, information regarding the recognizable object is generated as the notification data without adopting the preference data as the notification data, and it is therefore possible to provide interesting information that is at least visible.

Moreover, according to the information processing device 1 and method for a vehicle of the present embodiment, when the preference data of the occupant on board the vehicle is stored in the preference data storage unit 12 and there are objects for which the determination unit 15 determines that they are recognizable by the occupant, an object relating to the preference data of the occupant among the objects for which the determination unit 15 determines that they are recognizable by the occupant is generated as the notification data, and it is therefore possible to provide information which the occupant is most interested in.

Furthermore, according to the information processing device 1 and method for a vehicle of the present embodiment, the notification data to be generated is determined in accordance with the magnitude of the past usage record value of the occupant, and it is therefore possible to provide information that is even more interesting.

In addition, according to the information processing device 1 and method for a vehicle of the present embodiment, when the past usage record value of the occupant on board the vehicle is less than a predetermined value, information regarding the recognizable object is generated as the notification data without adopting the preference data of the occupant as the notification data, and it is therefore possible to exclude information regarding the past usage record which has no utility value.

Moreover, according to the information processing device 1 and method for a vehicle of the present embodiment, when the past usage record value of the occupant on board the vehicle is larger than a predetermined value, the notification data is generated based on the preference data of the occupant and the object determined to be recognizable; therefore, the preference data at the time of past use can be used and it is possible to provide information that is even more interesting.

Furthermore, according to the information processing device 1 and method for a vehicle of the present embodiment, the notification data generated as the object determined to be recognizable includes information regarding a relative position or distance from the vehicle in which the occupant is on board, and it is therefore possible to provide more useful content.

DESCRIPTION OF REFERENCE NUMERALS

1 Information processing device for a vehicle
    11 Identification data input unit 12 Preference data storage unit
13 Object acquisition unit
14 Past usage record detector
15 Determination unit
16 Notification data generator
17 Vehicle information acquisition unit
2 Vehicle sensors
3 Map database
4 External server
5 Telecommunication network
6 Notification device
7 Object data of objects existing around occupant
8 Communication unit
X Occupant

The invention claimed is:

1. An information processing device for a vehicle, comprising:
 a processor; and
 a memory,
 wherein the processor operates to:
 input identification data for identifying an occupant of the vehicle;
 store preference data regarding a preference of the occupant in association with the identification data in the memory;
 acquire object data of objects existing around an occupant on board the vehicle;
 determine whether or not an object included in the object data is visually or audibly recognizable by the occupant on board the vehicle; and
 generate notification data for the occupant on board the vehicle based on the object relating to the preference data of the occupant stored in the memory among the objects including the object data,
 wherein when there is an object determined to be visually or audibly recognizable by the occupant, information regarding the visually or audibly recognizable object is generated as the notification data over information regarding objects except the visually or audibly recognizable object,
 the processor further operates to:
 detect and calculate a time or frequency when the occupant used the information processing device for a vehicle; and
 determine the notification data to be generated in accordance with a magnitude of the time or frequency of the occupant,
 wherein when the time or frequency of the occupant on board the vehicle is less than a predetermined value, information regarding the recognizable object is generated as the notification data without adopting the preference data of the occupant as the notification data; and
 when the time or frequency of the occupant on board the vehicle is larger than the predetermined value, the notification data is generated based on the preference data of the occupant and the object determined to be recognizable.

2. The information processing device for a vehicle according to claim 1, wherein the notification data to be generated is determined in accordance with:
 whether or not the preference data of the occupant on board the vehicle is stored in the memory or whether or not the preference data stored in the memory satisfies a predetermined condition; and
 whether or not there is an object which is recognizable by the occupant.

3. The information processing device for a vehicle according to claim 2, wherein when the preference data of the occupant on board the vehicle is not stored in the memory or when the preference data stored in the memory does not satisfy the predetermined condition, information regarding the recognizable object is generated as the notification data without adopting the preference data as the notification data.

4. The information processing device for a vehicle according to claim 1, wherein when the preference data of the occupant on board the vehicle is stored in the memory and there are objects determined that they are recognizable by the occupant, an object relating to the preference data of the occupant among the objects determined that they are recognizable by the occupant is generated as the notification data.

5. The information processing device for a vehicle according to claim 1, wherein the object included in the object data is any one of a building, a store, a vehicle, a pedestrian, and an intersection that are specified based on image data captured by an onboard imaging device outside the vehicle.

6. The information processing device for a vehicle according to claim 1, wherein the notification data generated as the object determined to be recognizable for the occupant on board the vehicle includes information regarding a relative position or distance from the vehicle in which the occupant is on board.

7. An information processing method for a vehicle for processing information for the vehicle using a computer operated by a program, the computer operating to:
 receive identification data for identifying an occupant of the vehicle;
 store preference data regarding a preference of the occupant in association with the identification data;
 acquire object data of objects existing around an occupant on board the vehicle;
 determine whether or not an object included in the object data is visually or audibly recognizable by the occupant on board the vehicle; and
 generate notification data for the occupant on board the vehicle based on the object relating to the preference data of the occupant among the objects including the object data,
 wherein when there is an object determined to be visually or audibly recognizable by the occupant, information regarding the visually or audibly recognizable object is generated as the notification data over information regarding objects except the visually or audibly recognizable object,
 the computer further operating to:
 detect and calculate a time or frequency when the occupant used processed information for a vehicle; and
 determine the notification data to be generated in accordance with a magnitude of the time or frequency of the occupant,
 wherein when the time or frequency of the occupant on board the vehicle is less than a predetermined value, information regarding the recognizable object is generated as the notification data without adopting the preference data of the occupant as the notification data; and
 when the time or frequency of the occupant on board the vehicle is larger than the predetermined value, the notification data is generated based on the preference data of the occupant and the object determined to be recognizable.

* * * * *